(12) United States Patent
Zhu et al.

(10) Patent No.: US 9,658,055 B2
(45) Date of Patent: May 23, 2017

(54) ACCURACY TRACEABILITY METHOD BASED ON PRECISION COORDINATE CONTROL NETWORK FOR WORKSHOP MEASUREMENT POSITIONING SYSTEM

(71) Applicant: Tianjin University, Tianjin (CN)

(72) Inventors: Jigui Zhu, Tianjin (CN); Jiarui Lin, Tianjin (CN); Yongjie Ren, Tianjin (CN); Linghui Yang, Tianjin (CN); Yu Ren, Tianjin (CN)

(73) Assignee: Tianjin University, Tianjin (CN)

( * ) Notice: Subject to any disclaimer, the term of this patent is extended or adjusted under 35 U.S.C. 154(b) by 0 days.

(21) Appl. No.: 15/031,752

(22) PCT Filed: Mar. 25, 2014

(86) PCT No.: PCT/CN2014/074058
§ 371 (c)(1),
(2) Date: Apr. 25, 2016

(87) PCT Pub. No.: WO2015/074357
PCT Pub. Date: May 28, 2015

(65) Prior Publication Data
US 2016/0265903 A1    Sep. 15, 2016

(30) Foreign Application Priority Data
Nov. 20, 2013  (CN) .......................... 2013 1 0590016

(51) Int. Cl.
*G01B 11/00* (2006.01)
*G01S 17/87* (2006.01)
(Continued)

(52) U.S. Cl.
CPC .......... *G01B 11/002* (2013.01); *G01S 7/4972* (2013.01); *G01S 17/66* (2013.01); *G01S 17/87* (2013.01)

(58) Field of Classification Search
USPC ................................................ 356/600–640
See application file for complete search history.

(56) References Cited

U.S. PATENT DOCUMENTS

| 5,436,840 | A  | * | 7/1995 | Lam ........................ | G01C 21/30 |
|           |    |   |        |                              | 340/988 |
| 6,515,618 | B1 | * | 2/2003 | Lupash .................... | G01S 19/20 |
|           |    |   |        |                              | 342/357.29 |

(Continued)

FOREIGN PATENT DOCUMENTS

| CN | 101644563 A | 2/2010 |
| CN | 102374847 A | 3/2012 |

(Continued)

OTHER PUBLICATIONS

Xiong Zhi, etal., Application of workspace measurement and positioning system in aircraft manufacturing assembly, <Digital inspection technology for aircraft>, 2011, p. 60-62, No. 21.

*Primary Examiner* — Tri Ton
*Assistant Examiner* — Jarreas C Underwood
(74) *Attorney, Agent, or Firm* — Bei & Ocean; George G. Wang

(57) ABSTRACT

The present invention relates to an accuracy traceability method based on precision coordinates control network for workshop Measurement Positioning System, which includes the steps: setting a plurality of SMR (Spherically Mounted Retroreflector) nests and stations in the measurement space; forming a global control point by using SMR; measuring all the 3-d coordinates of global control points in all the laser tracker stations; using the range value measured by the laser tracker as constraints to calculate the 3-d coordinates of global control points by using the dynamic weighting method; arranging a plurality of transmitters and calibrating the transmitters in combination with precision coordinate control network; measuring all global control points and (Continued)

measured points simultaneously by using wMPS, and using the 3-d coordinates of global control points as the constraints for adjustment calculation to obtain the 3-d coordinates of the measured points. The present invention takes advantages of accurate range measurement of laser tracker as a constraint to achieve the followings: obtaining high accuracy 3-d coordinates of global control points, constructing precision coordinate control network and using it as the measurement standards of wMPS, achieving on-site accuracy traceability, and thus improving the measurement accuracy of wMPS.

3 Claims, 4 Drawing Sheets

(51) Int. Cl.
*G01S 17/66* (2006.01)
*G01S 7/497* (2006.01)

(56) References Cited

U.S. PATENT DOCUMENTS

| | | | | |
|---|---|---|---|---|
| 7,352,446 B2* | 4/2008 | Bridges | ............... | G01B 11/024 356/5.13 |
| 7,590,589 B2* | 9/2009 | Hoffberg | .............. | G06Q 20/401 705/35 |
| 7,660,588 B2* | 2/2010 | Sheynblat | ............. | G01S 5/0263 455/456.1 |
| 7,679,727 B2* | 3/2010 | Benz | ................... | G01C 15/002 356/4.01 |
| 8,600,830 B2* | 12/2013 | Hoffberg | ............ | G06Q 30/0207 705/14.71 |
| 9,228,836 B2* | 1/2016 | Girod | ..................... | G01C 15/00 |
| 2004/0137955 A1* | 7/2004 | Engstrom | ............. | H04L 12/589 455/566 |

FOREIGN PATENT DOCUMENTS

| | | |
|---|---|---|
| CN | 102997846 A | 3/2013 |
| CN | 103591891 A | 2/2014 |

* cited by examiner

Receiver
104

ACCURACY TRACEABILITY METHOD BASED ON PRECISION COORDINATE CONTROL NETWORK FOR WORKSHOP MEASUREMENT POSITIONING SYSTEM

CROSS-REFERENCE TO RELATED APPLICATIONS

This application claims priority from CN Application No. CN201310590016.8, filed Nov. 20, 2013 and PCT Application No. PCT/CN2014/074058, filed Mar. 15, 2014, the contents of which are incorporated herein in the entirety by reference.

FIELD OF THE INVENTION

The present invention relates to a large-scale three-dimensional coordinate measuring method in industrial field, and more particularly relates to an accuracy traceability method for precision coordinate control network of wMPS (workshop Measurement Positioning System).

BACKGROUND OF THE INVENTION

The wMPS (workshop Measurement Positioning System) is a novel distributed measuring and positioning system based on multiple angle measurements. It can realize automatic and accurate coordinate measurement and is applicable in large-scale manufacturing such as aerospace, aviation, shipbuilding, etc. FIG. 1 shows a diagram of an existing wMPS described in the network construction of laser-scan space measurement positioning system. As shown in FIG. 1, the wMPS mainly includes a plurality of transmitters 101, a plurality of receivers 102 and a processing unit 103. By referring to GPS (Global Positioning System), the wMPS adopts a plurality of transmitters 101 to constitute the measurement network, applies photoelectric-scanning spatial angle intersection to automatically locate the individual receiver 102. When in operation, the transmitter 101 takes no responsibility to calculate the coordinates of receivers and only launches optical signals with angle information for positioning the photoelectric receiver in the measurement space.

Due to wMPS adopts photoelectric-scanning spatial angle intersection measurement to acquire three-dimensional coordinates, measurement error increases significantly with the measurement distance, therefore, on-site accuracy traceability method is required to insure the measurement reliability. Traditional on-site accuracy traceability method adopts standard devices as the measuring standards, which has disadvantages of inconvenient to carry and maintenance, low measurement flexibility, poor adaptability for large-scale workspace and bad environment, etc. And so far, there is no reliable traceability standard in the technical field of large-scale space.

Therefore, developing accuracy traceability method based on precision coordinate control network for wMPS can improve the measurement accuracy of workshop Measurement Positioning System, and achieve accuracy traceability of on-site measurement.

SUMMARY OF THE INVENTION

The present invention is intended to provide an accuracy traceability method for compensating accuracy loss caused by measurement distance increase for wMPS, and eliminating drawbacks of difficulty in use of devices in on-site large-scale measurement. This method makes full use of the characteristic of laser tracker that its interferometer range measurement can be traceable to laser wavelength. The present invention takes advantages of accurate range measurement of laser tracker as a constraint to achieve the followings: obtaining a high accuracy 3-d coordinates of global control points, constructing a precision coordinate control network and using it as the measurement standards of wMPS, achieving on-site accuracy traceability, and thus improving the measurement accuracy of wMPS.

For overcoming the above-mentioned defects, the present invention is intended to provide an accuracy traceability method for precision coordinate control network of workshop measurement positioning system, and comprises the following steps:

Step 1: providing N SMR (Spherically Mounted Retroreflector) nests and M stations in a measurement space, and arranging a laser tracker in station 1;

Step 2: arranging an 1.5 inches SMR on the SMR nest 1 to form a global control point 1 and measuring the 3-d coordinates of the global control point 1. Then by the same manner, moving the SMR to SMR nest 2, SMR nest 3 . . . until SMR nest N−1 and SMR nest N respectively, to measure the 3-d coordinates of global control point 2, global control point 3 . . . until global control point N−1 and global control point N;

Step 3: arranging the laser tracker on station 2, station 3 . . . until station M−1 and station M in sequence, and repeating the step 2 after each time the laser tracker is moved; thus the measurements for all the global control points via all the stations are achieved. In the step 2 and step 3, the laser tracker must measure at least 3 global control points at each station;

Step 4: calculating the positions (locations and orientations) of stations according to the 3-d coordinates of all global control points at all stations, thus obtaining initial iteration values of 3-d coordinates of all the stations and global control points;

Step 5: using the range value from station to global control point measured by the laser tracker as a constraint to establish optimization goal equation for adjustment calculation; by using the dynamic weighting method, tracing the measurement accuracy of 3-d coordinates of global control points to that of the interferometer range measurement of the laser tracker, thus establishing the precision coordinate control network;

Step 6: arranging and initializing a plurality of transmitters, and then calibrating the transmitters in combination with the precision coordinate control network;

Step 7: measuring the global control points and measured points simultaneously by wMPS, and using the 3-d coordinates of global control points as the constraint for adjustment calculation to obtain the 3-d coordinates of the measured points, and tracing the obtained 3-d coordinates of the measured points to the precision coordinate control network.

Compared with the prior art, the present invention has the following advantages.

The present invention uses the characteristics of laser tracker that its interferometer range measurement can be traceable to laser wavelength, takes accurate range measurement of the laser tracker as a constraint, thus obtains the followings: obtaining accurate 3-d coordinates of global control points on on-site fixtures, constructing precision coordinate control network and using it as the on-site accurate measuring standards. Meanwhile, the wMPS system can simultaneous measure the global control points and measured points simultaneously, and uses high-accurate adjustment algorithm to reproduce the accuracy of the global control points to the measured points, thus achieves on-site accuracy traceability and improves the measurement accuracy of the wMPS system.

DETAILED DESCRIPTION OF THE INVENTION

The present invention will be further described in detail with reference to specific embodiments.

Figure 1:
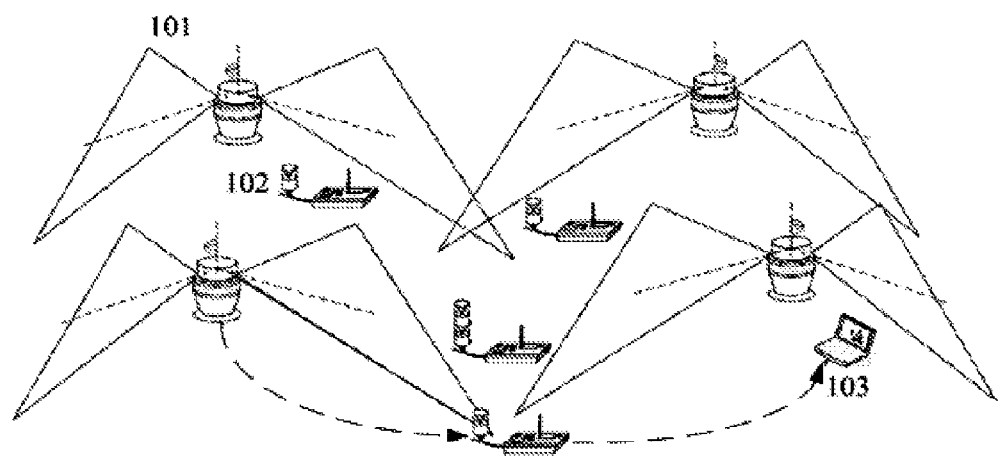
FIG. 1 shows a diagram of wMPS (workshop Measurement Positioning System) of the prior art.

The system of the present invention is developed based on wMPS (workshop Measurement Positioning System) which uses existing technology described in the network construction of laser-scan space measurement positioning system, and is combined with precision coordinate control network to achieve on-site measurement accuracy traceability. FIG. 1 shows a diagram of an existing wMPS in which the wMPS applies photoelectric-scanning spatial angle intersection automatic measurement to position the individual photoelectric receiver (hereinafter referred to as receiver). When in operation, the transmitters of the wMPS are not responsible for calculating the coordinates of receivers and only launch optical signals with angle information for positioning the receiver in the measurement space. Each receiver may automatically measure angles from the transmitters by receiving the optical signals emitted from the transmitters, and then calculate the 3-d coordinates using the angle intersection method and the known position (location and orientation) information of the transmitters.

Figure 2:
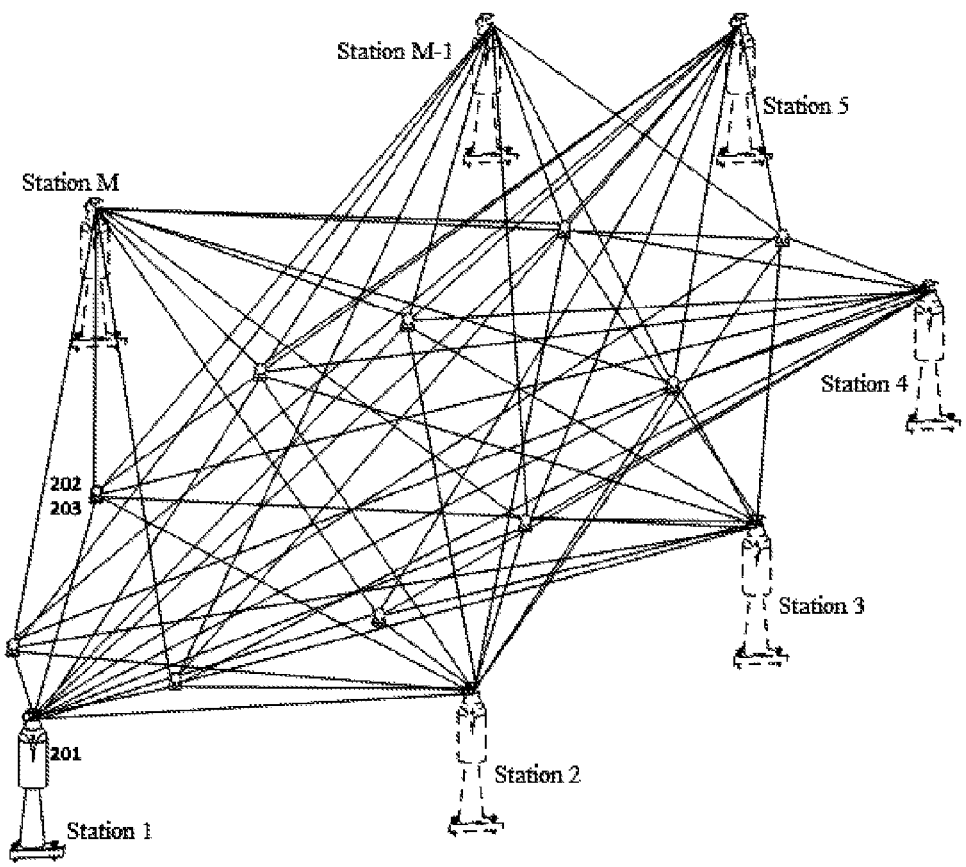
FIG. 2 shows a process diagram illustrating measuring 3-d coordinates of global control points by a plurality of stations.
Figure 5:
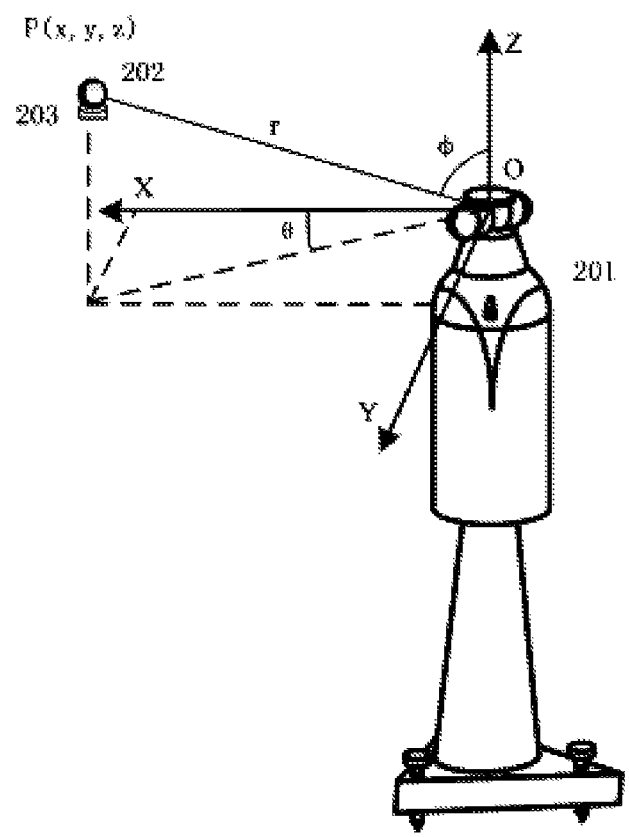
FIG. 5 shows the spherical coordinate model of laser tracker 201.

As shown in FIG. 2, in order to improve the measurement accuracy of wMPS and realize the traceability of on-site measurement, the present invention is intended to provide an accuracy traceability method based on precision coordinate control network for workshop measurement positioning system, and includes the following steps (takes the large aircraft components assembly as example):

Step 1: providing N SMR nests on the assembly fixture of the aircraft, setting M stations around the large docking components, and arranging laser tracker 201 in station 1;

Step 2: arranging an SMR 202 (a 1.5 inches SMR in this embodiment) on the SMR nest 1 to form a global control point 1, and measuring 3-d coordinates of global control point 1 by the laser tracker 201, and by the same manner, moving the SMR 202 to SMR nest 2, SMR nest 3 . . . until SMR nest N−1 and SMR nest N respectively, to measure the 3-d coordinates of global control point 2, global control point 3 . . . until global control point N−1 and global control point N;

Step 3: arranging the laser tracker 201 on station 2, station 3 . . . until station M−1 and station M in sequence, and repeating the step 2 after moving the laser tracker 201; thus the measurements for all the global control points via all the stations are achieved. In the step 2 and step 3, the laser tracker 201 must measure at least 3 global control points at each station;

Step 4: calculating the positions (locations and orientations) of stations according to the 3-d coordinates of all global control points at all stations, thus obtaining initial iteration values of 3-d coordinates of all the stations and global control points;

Step 5: using the range value from station to global control point measured by the laser tracker 201 as a constraint to establish optimization goal equation for adjustment calculation; by using the dynamic weighting method, tracing the measurement accuracy of 3-d coordinates of global control points to that of the interferometer range measurement of the laser tracker 201, thus establishing the precision coordinate control network; the detailed process is as follows:

Step 5-1: the laser tracker 201 is a spherical coordinate measurement system, the mathematical model of which is shown in FIG. 5, and the range value is expressed as:

$$r = \sqrt{x^2 + y^2 + z^2} \tag{1}$$

According to the 3-d coordinates of global control points in individual station coordinates, calculating the range value $r_{ij}$ of global control points via formula (1), taking $r_{ij}$ as the measured value during the optimization process; wherein, i represents the $i^{th}$ station, i=1,2, . . . , M; j represents the $i^{th}$ global control point, j=1,2, . . . , N;

Step 5-2: taking the coordinates of station 1 as the global coordinates to calibrate each stations, and calculating the 3-d coordinates of global control points $(x_j^0\ y_j^0\ z_j^0)$ and station $(X_i^0\ Y_i^0\ Z_i^0)$ of the laser tracker in global coordinates, which are taken as the initial values during the optimization process;

Establishing redundant range equations in global coordinates, the formula is expressed as follows:

$$l_{ij} = \sqrt{(x_j - X_i)^2 + (y_j - Y_i)^2 + (z_j - Z_i)^2} \tag{2}$$

Wherein, $l_{ij}$ is range value, formula (1) is expanded by $(x_j^0\ y_j^0\ \text{and}\ z_j^0)$ and $(X_i^0\ Y_i^0\ Z_i^0)$ via first-order Taylor series expansion to obtain:

$$\tilde{l}_{ij} = \tag{3}$$

$$l_{ij}^0 + \frac{\partial l_{ij}}{\partial X_i}\Delta X_i + \frac{\partial l_{ij}}{\partial Y_i}\Delta Y_i + \frac{\partial l_{ij}}{\partial Z_i}\Delta Z_i + \frac{\partial l_{ij}}{\partial x_j}\Delta x_j + \frac{\partial l_{ij}}{\partial y_j}\Delta y_j + \frac{\partial l_{ij}}{\partial z_j}\Delta z_j.$$

Wherein, $(\Delta x_j\ \Delta y_j\ \Delta z_j)$ and $(\Delta X_i\ \Delta Y_i\ \Delta Z_i)$ are the corrected values of 3-d coordinates of global control points and station of laser tracker respectively; the following error equation is established by formula (3):

$$vl_{ij} = \tilde{l}_{ij} - r_{ij} \tag{4}$$

For M stations of laser tracker and N global control points, the redundant error equations are expressed as followings:

$$V = A\Delta X - b \tag{5}$$

Wherein, matrix A is a large sparse matrix expanded by formula (2) via first order Taylor series expansion, and $$\Delta X = [\Delta X_1, \Delta Y_1, \Delta Z_1, \Delta X_2, \Delta Y_2, \Delta Z_2, \ldots \Delta X_M, \Delta Y_M, \Delta Z_M,$$
$$\Delta x_1, \Delta y_1, \Delta z_1, \Delta x_2, \Delta y_2, \Delta z_2, \ldots, \Delta x_N, \Delta y_N, \Delta z_N]^T$$

$$b = [r_{11} - l_{11}^0, r_{12} - l_{12}^0, \ldots, r_{MN} - l_{MN}^0]^T;$$

Step 5-3: weighting the vector V according to the range accuracy $\sigma_l$ of laser tracker, the expression is as follows:

$$P=\mathrm{diag}((\sigma_l l_{11})^{-2},(\sigma_l l_{12})^{-2},\ldots,(\sigma_l l_{MN})^{-2}) \quad (6)$$

Step 5-4: Initial weighting the vector $[\Delta x_1, \Delta y_1, \ldots, \Delta x_N, \Delta y_N, \Delta z_N]^T$ according to the range and angle accuracy of the laser tracker, and initial weighting the vector $[\Delta X_1, \Delta Y_1, \Delta Z_1, \ldots, \Delta X_M, \Delta Y_M, \Delta Z_M]^T$ according to the calibration accuracy, thus obtaining initial weight matrix $P_{x_0}$ of vector $\Delta X$;

Step 5-5: if the number N of global control points and the number M of stations of laser trackers meet the requirement of MN>3(M+N), establishing optimization object formulas of:

$$\begin{cases} V^T P V = \min \\ \Delta X^T P_{X_0} \Delta X = \min \end{cases} \quad (7)$$

Figure 3:
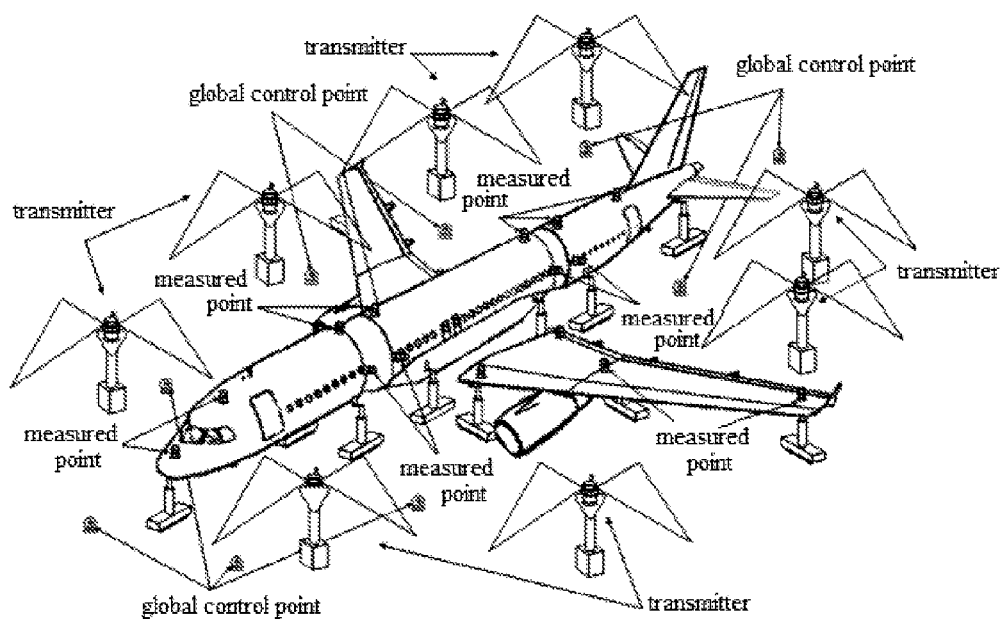
FIG. 3 shows a diagram illustrating accuracy traceability based on the precision coordinates control network.
Figure 4:
FIG. 4 shows a receiver 104 which has size and shape which equal to the 1.5 inches reflector.

Because the matrix A is an ill-conditioned matrix with bad matrix condition number, one little error may result in a distorted solution when performing adjustment calculation, the present invention performs an iteration calculation with the singular value decomposition and generalized inverse matrix method;

Calculating vector $\Delta X^k$ and covariance matrix $Q_x^k$ in each iteration, indexed by k; and correcting the $P_{X_0}$ according to the $Q_x^k$ to achieve dynamic weighting;

Performing iteration until the end condition is satisfied, thus obtaining the 3-d coordinates of global control points and completing the establishment of precision coordinate control network;

Step 6: arranging and initializing a plurality of transmitters 101, and then calibrating the transmitters in combination with the precision coordinate control network to establish the measurement network; the steps are as follows:

Step 6-1: Replacing the SMR 202 of the global control point with the receiver 104 which has same size and shape as a 1.5 inches SMR; keeping the locations of the SMR nests 203 unchanged during replacing process, thus keeping the 3-d coordinates of the global control points unchanged;

Step 6-2: arranging transmitters 101 in the measurement space, and arranging at least four global control points between every two transmitters for receiving signals from both transmitters simultaneously;

Step 6-3: arranging a plurality of scale bars at multiple locations in the measurement space after rotating speeds of the transmitters 101 are stabled, and completing the calibration of wMPS by using scale bars and global control points, and finally forming the measurement network;

Step 7: As shown in FIG. 3, measuring the global control points and measured points simultaneously by using wMPS, and using the 3-d coordinates of global control points as the constraint for adjustment calculation to obtain the 3-d coordinates of the measured points, and finally tracing the obtained 3-d coordinates of the measured points to the precision coordinate control network; the detailed steps are as follows:

Step 7-1: keeping all the receivers 104 located in the global control points and all the transmitters 101 unchanged;

Step 7-2: arranging receiver 104 in the measured points of the measurement space, each receiver must receive signals from at least two transmitters 101 simultaneously;

Step 7-3: measuring the global control points and measured points simultaneously by using the measurement network formed by transmitters 101, and using the 3-d coordinates of global control points as the constraints for adjustment calculation to obtain the 3-d coordinates of the measured points, and finally tracing the obtained 3-d coordinates of the measured points to the precision coordinate control network.

The present invention uses the characteristics of laser tracker that its interferometer range measurement can be traceable to laser wavelength, takes accurate measurement of the laser tracker as a constraint, thus obtaining the followings: obtaining an accurate 3-d coordinates of global control points on on-site fixture, constructing precision coordinate control network and using it as the on-site accurate measuring standards. Meanwhile, wMPS can measure the global control points and measured points simultaneously, and uses accurate adjustment calculation method to reproduce the accuracy of the global control point to the measured points, thus achieving on-site accuracy traceability and improves the measurement accuracy of the wMPS. The present invention has the advantages of:

Compensating the accuracy loss caused by measurement distance increase for wMPS;

Improving the calibration efficiency and accuracy of wMPS by completing the transmitter calibration with precision coordinate control network;

Achieving accuracy traceability of 3-d coordinate measurement of wMPS by providing the precision coordinate control network as the measurement standard;

Improving the measurement accuracy of wMPS without affecting the work efficiency.

Though various embodiments accompanied with drawings of the invention have been illustrated above, a person of ordinary skill in the art will understand that, variations and improvements made upon the illustrative embodiments fall within the scope of the invention, and the scope of the invention is only limited by the accompanying claims and their equivalents.

What is claimed is:

1. An accuracy traceability method based on precision coordinate control network for wMPS(workshop Measurement Positioning System), comprising the following steps:

Step 1: providing N SMR nests and M stations in the measurement space and arranging a laser tracker (201) in station 1;

Step 2: arranging an SMR (202) on SMR nest 1 to form a global control point 1, measuring 3-d coordinates of global control point 1, and by the same manner, moving the SMR(202) to SMR 2, SMR 3 . . . until SMR N−1 and SMR N respectively to measure the 3-d coordinates of global control point 2, global control point 3 . . . until global control point N−1 and global control point N;

Step 3: arranging the laser tracker (201) on station 2, station 3 . . . until station M−1 and station M in sequence, and repeating the step 2 after each time the laser tracker (201) is moved, thus obtaining measurements for all the global control points via all the stations and in the step 2 and step 3, the laser tracker (201) must measure at least 3 global control points at each station;

Step 4: calculating the positions (locations and orientations) of stations according to the 3-d coordinates of all global control points at all stations, thus obtaining initial iteration values of 3-d coordinates of all the stations and global control points;

Step 5: using the range value from station to global control point measured by the laser tracker (201) as a constraint to establish optimization goal equation for adjustment calculation; by using the dynamic weighting method, tracing the measurement accuracy of 3-d coordinates of global control points to that of the interferometer range measurement of the laser tracker (201), thus establishing the precision coordinate control network; wherein the detailed steps of establishing the precision coordinate control network comprise:

Step 5-1: according to the 3-d coordinates of global control points in individual station coordinates, calculating the range value $r_{ij}$ of the laser tracker; wherein, i represents the $i^{th}$ station, i=1,2, . . . , M; j represents the $j^{th}$ global control point, j=1,2, . . . , N;

Step 5-2: taking the coordinates of station 1 as the global coordinates to calibrate each stations, and calculating the 3-d coordinates of global control points $(x_j^0\ y_j^0\ z_j^0)$ and station $(x_i^0\ y_i^0\ z_i^0)$ of the laser tracker in global coordinates, which are taken as the initial values during the optimization process;

Establishing redundant range equations in global coordinates, the formula is expressed as follows:

$$l_{ij} = \sqrt{(x_j - X_i)^2 + (y_j - Y_i)^2 + (z_j - Z_i)^2} \quad (1)$$

Wherein, $l_{ij}$ is range value, formula (1) is expanded by $(x_j^0\ y_j^0\ z_j^0)$ and $(X_i^0\ Y_i^0\ Z_i^0)$ via first order Taylorseries expansion to obtain:

$$\tilde{l}_{ij} = l_{ij}^0 + \frac{\partial l_{ij}}{\partial X_i}\Delta X_i + \frac{\partial l_{ij}}{\partial Y_i}\Delta Y_i + \frac{\partial l_{ij}}{\partial Z_i}\Delta Z_i + \frac{\partial l_{ij}}{\partial x_j}\Delta x_j + \frac{\partial l_{ij}}{\partial y_j}\Delta y_j + \frac{\partial l_{ij}}{\partial z_j}\Delta z_j \quad (2)$$

Wherein, $(\Delta x_j\ \Delta y_j\ \Delta z_j)$ and $(\Delta X_i\ \Delta Y_i\ \Delta Z_i)$ are the corrected values of 3-d coordinates of global control points and station of laser tracker respectively; the following error equation is established by formula (2):

$$vl_{ij} = \tilde{l}_{ij} - r_{ij} \quad (3)$$

For M stations of laser tracker and N global control points, the redundant error equations are expressed as followings:

$$V = A\Delta X - b \quad (4)$$

Wherein, matrix A is a large sparse matrix expanded by formula (1) via first order Taylor series expansion, and $$\Delta X = [\Delta X_1, \Delta Y_1, \Delta Z_1, \Delta X_2, \Delta Y_2, \Delta Z_2, \ldots, \Delta X_M, \Delta Y_M, \Delta Z_M, \Delta x_1, \Delta y_1, \Delta z_1, \Delta x_2, \Delta y_2, \Delta z_2, \ldots, \Delta x_N, \Delta y_N, \Delta z_N]^T$$

$$b = [r_{11} - l_{11}^0, r_{12} - l_{12}^0, \ldots r_{MN} - l_{MN}^0]^T;$$

Step 5-3: weighting the vector V according to the range accuracy $\sigma_l$ of laser tracker, the formula is expressed as follows:

$$P = \mathrm{diag}((\sigma_l l_{11})^{-2}, (\sigma_l l_{12})^{-2}, \ldots (\sigma_l l_{MN})^{-2}) \quad (5)$$

Step 5-4: Initial weighting the vector $[\Delta x_1, \Delta y_1, \ldots, \Delta x_N, \Delta y_N, \Delta z_N]^T$ according to the range and angle accuracy of the laser tracker, and initial weighting the vector $[\Delta X_1, \Delta Y_1, \Delta Z_1, \ldots, \Delta X_M, \Delta Y_M, \Delta Z_M]^T$ according to the calibration accuracy, thus obtaining initial weight matrix $P_{X_0}$ of vector $\Delta X$;

Step 5-5: if the number N of global control points and the number M of stations of laser trackers meet the requirement of MN>3(M+N), establishing optimization object formulas of:

$$\begin{cases} V^T P V = \min \\ \Delta X^T P_{X_0} \Delta X = \min \end{cases} \quad (6)$$

Performing iteration calculating with the singular value decomposition and generalized inverse matrix method;

Calculating vector $\Delta X^k$ and covariance matrix $Q_x^k$ in each iteration, indexed by k; and correcting the $P_{X_0}$ according to the $Q_x^k$ to achieve dynamic weighting;

Performing iteration until the end condition is satisfied, thus obtaining the 3-d coordinates of global control points and completing the establishment of precision coordinate control network;

Step 6: arranging and initializing a plurality of transmitters(101), and then calibrating the transmitters in combination with the precision coordinate control network to establish the measurement network;

Step 7: measuring the global control points and measured points simultaneously by using wMPS(workshop Measurement Positioning System), and using the 3-d coordinates of global control points as the constraint for adjustment calculation to obtain the 3-d coordinates of the measured points, and finally tracing the obtained 3-d coordinates of the measured points to the precision coordinate control network.

2. The accuracy traceability method based on precision coordinate control network for wMPS (workshop Measurement Positioning System) according to claim 1, wherein the SMR(202) is 1.5 inches SMR; and the detailed steps of calibrating the transmitters in combination with the precision coordinate control network of step 6 comprise:

Step 6-1: Replacing the SMR(202) of the global control point with the receiver (104) which has same size and shape as a 1.5 inches SMR; keeping the locations of the SMR nests(203) unchanged during replacing process, thus keeping the 3-d coordinates of the global control points unchanged;

Step 6-2: arranging the transmitters (101) in the measurement space, and arranging at least four global control points between every two transmitters for receiving signals from both transmitters simultaneously;

Step 6-3: arranging a plurality of scale bars at multiple locations in the measurement space after rotating speeds of the transmitters (101) are stabled, and completing the calibration of wMPS by using scale bars and global control points, and finally forming the measurement network.

3. The accuracy traceability method based on precision coordinate control network for workshop measurement positioning system according to claim 1, wherein the detailed steps of calibrating the transmitters in combination with the precision coordinate control network of step 7 comprise:

Step 7-1: keeping all the receivers (104) located in the global control points and all the transmitters (101) unchanged;

Step 7-2: arranging receivers (104) in the measured points of measurement space, each receiver (104) must receive signals from at least two transmitters (101) simultaneously;

Step 7-3: measuring the global control points and measured points simultaneously by using the measurement network formed by transmitters 101, and using the 3-d coordinates of global control points as the constraints for adjustment calculation to obtain the 3-d coordinates of the measured points, and finally tracing the obtained 3-d coordinates of the measured points to the precision coordinate control network.

* * * * *